United States Patent
Jung et al.

(10) Patent No.: US 6,408,891 B1
(45) Date of Patent: Jun. 25, 2002

(54) FLEXIBLE PIPE FOR STATIC USE IN A CORROSIVE AMBIENCE

(75) Inventors: Patrice Jung, Hameau de Caveaumont; José Mallen Herrero, Paris; Jean-Marc Leroy, Rueil Malmaison; Xavier Longaygue, Noisy le Grand, all of (FR)

(73) Assignees: Institut Francais du Petrole, Rueil-Malmaison Cedex; Coflexip, Paris, both of (FR)

( * ) Notice: Subject to any disclaimer, the term of this patent is extended or adjusted under 35 U.S.C. 154(b) by 0 days.

(21) Appl. No.: 09/622,364

(22) PCT Filed: Feb. 17, 1999

(86) PCT No.: PCT/FR99/00361

§ 371 (c)(1),
(2), (4) Date: Aug. 16, 2000

(87) PCT Pub. No.: WO99/42754

PCT Pub. Date: Aug. 26, 1999

(30) Foreign Application Priority Data

Feb. 18, 1998 (FR) .............................. 98 01944

(51) Int. Cl.⁷ ................................................ F16L 11/10
(52) U.S. Cl. ........................ 138/127; 138/130; 138/134
(58) Field of Search .................. 138/127, 126, 138/125, 129, 130, 134

(56) References Cited

U.S. PATENT DOCUMENTS

| | | | | |
|---|---|---|---|---|
| 4,402,346 A | * | 9/1983 | Cheetham et al. .......... | 138/130 |
| 4,431,034 A | * | 2/1984 | Abdullaeu et al. .......... | 138/130 |
| 4,850,395 A | * | 7/1989 | Briggs ........................ | 138/124 |
| 4,867,205 A | * | 9/1989 | Bournazel et al. .......... | 138/130 |
| 5,117,874 A | * | 6/1992 | Ochiai et al. ............... | 138/140 |
| 5,176,179 A | * | 1/1993 | Bournazel et al. .......... | 138/130 |
| 5,307,842 A | * | 5/1994 | Legueux ..................... | 138/130 |
| 6,053,213 A | * | 4/2000 | Jung et al. .................. | 138/130 |
| 6,098,667 A | * | 8/2000 | Odru .......................... | 138/134 |
| 6,110,550 A | * | 8/2000 | Jarrin et al. ................ | 138/134 |
| 6,123,114 A | * | 9/2000 | Seguin et al. ............... | 138/130 |

\* cited by examiner

Primary Examiner—James Hook
(74) Attorney, Agent, or Firm—Antonelli, Terry, Stout & Kraus, LLP

(57) ABSTRACT

The present invention relates to a flexible tubular pipe for carrying fluids under pressure containing $H_2S$ and to a method for designing such a flexible pipe. The pipe includes a body (7), an internal sealing sheath (8), at least one steel armouring layer (9,10) withstanding the stresses induced by the inside/outside pressure difference, and at least one traction-resisting steel armouring layer (11, 12) spirally wound at an angle less than 45° in relation to the axis of the pipe. In this pipe, at least the armouring layer withstanding the stresses induced by the inside/outside pressure difference is made of a determined steel meeting $H_2S$ resistance criteria, and at least the traction-resisting armouring layer is made from steel wires that do not meet $H_2S$ resistance criteria.

7 Claims, 1 Drawing Sheet

FLEXIBLE PIPE FOR STATIC USE IN A CORROSIVE AMBIENCE

FIELD OF THE INVENTION

The invention relates to an optimized structure of a flexible pipe reinforced with metallic armours suited to carry effluents under pressure containing $H_2S$. The present invention is suitable for flowline type flexible pipes, i.e. flexible pipes unwound from a boat in order to be laid on the sea bottom and connected between wellheads and/or subsea gathering facilities. The invention relates more particularly to the field of deep offshore where the pipe undergoes great tensile stresses as it is laid on the bottom, but where the stresses due to the pressure are preponderant when the pipe is in service since it then lies on the sea bottom.

BACKGROUND OF THE INVENTION

The current method for designing flexible pipes consists in determining the structure of a flexible pipe by combining one or more sheaths forming a seal against the gases or the liquids carried therein with armouring layers intended to withstand stresses, i.e. the inside pressure, the outside pressure, and the tensile stresses resulting from the weight of the pipe or from the inside pressure.

One can refer to documents API RP 17B (Recommended Practices) and SPEC 17J (Specification) relating to flexible pipes.

In general, a flexible pipe comprises, from the inside to the outside, a body consisting for example of an interlocked steel tape, a polymer sealing sheath, at least one pressure armouring consisting of interlocked wires spirally wound with a small pitch, at least one layer of traction armour wires spirally wound with a long pitch. This. configuration is referred to as rough bore.

A variant of a flexible pipe can comprise an internal sealing sheath, a first armouring mainly withstanding the pressure generated by the fluid in the internal sheath, generally referred to as pressure layer, possibly a second armour essentially withstanding the traction produced notably by the pressure of the fluid. This variant is referred to as smooth bore.

In another variant, some flexible pipes comprise an armouring placed above the sealing sheath, both withstanding longitudinal tensile stresses and the circumferential component due to the inside pressure of the fluid. Such a pressure armouring can comprise two layers of reverse-pitch spiral wires whose armouring angles are close to 55°. The stresses due to the inside pressure are in this case taken up by these layers.

In case of the presence of gas $H_2S$ in the effluent carried by a flexible pipe, the quality of the steels used for manufacturing all the armouring wires and the mechanical and thermal treatments applied to these wires (notably cold drawing when forming, then possibly annealing) must be selected so that these wires jointly provide the mechanical strength required during operation and laying, and corrosion resistance in the presence of $H_2S$. Steels having relatively low mechanical qualities are therefore used, or steels of a specific composition combined with suitable thermal treatments. In the first case, this leads to disadvantageous steel weights, in the other case, it often leads to higher manufacturing costs. Documents WO-91/16,461 and WO-96/28,575 can be mentioned here by way of reference.

SUMMARY OF THE INVENTION

The present invention is based on the concept of a flexible pipe structure comprising armourings made from wires referred to as <<$H_2S$>> so as to meet the criteria known in $H_2S$ ambiences, and armouring wires made of a material that does not meet $H_2S$ resistance criteria. The invention also relates to a method for designing a flexible pipe structure suited to applications in a $H_2S$ ambience, a method wherein a stress level is determined in the reinforcing wires, a level below which using $H_2S$ steel is not necessary and above which $H_2S$ steels must be used for manufacturing the reinforcing wires.

A steel known as <<$H_2S$>> steel corresponds to criteria which are well known in the trade. One of these criteria is the hardness (HRC) of the steel considered: below 22 HRC, it is assumed that the steel is compatible with a $H_2S$ ambience. There is an equivalence between the hardness and the breaking strength Rm, in the present case a 22 HRC hardness corresponds to a breaking strength of about 775 to 800 MPa. This breaking strength is associated with a relatively low elastic limit of the steel, less than or equal to about 700 MPa. Another criterion allows to disregard the hardness criterion which is sufficient but not obligatorily necessary for certain steel types that have been subjected to a mechanical and/or thermal treatment. A steel is also considered to be compatible with a $H_2S$ ambience if, according to the TM0177-96 standard (method A), it can be shown that no failure appears after representative samples have been immersed for thirty days in a $H_2S$ solution and placed under a stress defined for example as equal to 90% of the elastic limit $R_{p0.2}$. This test is known as SSCC or sulfide stress corrosion cracking test. In parallel with test TM0177-96, another test known as <<HIC>> must be carried out. The test according to the TM0284-96 standard is relative to the blistering effects induced by the hydrogen (Hydrogen Induced Cracking) present in a type A solution, defined in the test procedure. For a steel to be compatible with $H_2S$, only very limited damage by volume is allowed, for example of the order of 1%, preferably below 3% of the projected area. Documents WO-91/16,461 and WO-96/28,575, already mentioned above, which describe $H_2S$ steels, can be mentioned by way of reference.

The present invention thus relates to a flexible tubular pipe for carrying fluids under pressure containing $H_2S$. The pipe comprises a body, an internal sealing sheath, at least one steel armouring layer withstanding the stresses induced by the inside/outside pressure difference, at least one traction-resisting steel armouring layer spirally wound at an angle less than 45° in relation to the axis of the pipe. In this pipe according to the invention, at least the armouring layer withstanding the stresses induced by the side/outside pressure difference is made of a determined steel meeting $H_2S$ resistance criteria, and at least the traction-resisting armouring layer is made from wires that do not meet the $H_2S$ resistance criteria.

The pipe can comprise an intermediate sheath on the outside of which, in relation to the inside of the pipe, the traction-resisting armouring layer made from steel wires that do not meet the $H_2S$ resistance criteria is arranged.

The steel armouring layer withstanding the stresses induced by the inside/outside pressure difference can comprise at least reinforcing wires wound at an angle close to 90° in relation to the axis of the pipe.

The steel armouring layer withstanding the stresses induced by the inside/outside pressure difference can comprise at least reinforcing wires wound at an angle close to 55°.

In the previous variant, the pipe can comprise in combination, from the inside to the outside, a body, a sealing sheath, two H₂S steel armouring layers crossed at 55°, two non H₂S steel armouring layers crossed at an angle less than 40°.

In another variant, the pipe according to the invention can comprise in combination, from the inside to the outside, a body, a sealing sheath, a pressure layer made of wires spirally wound at an angle close to 90° and two armouring layers crossed at an angle less than 40° made of H₂S steel, and two armouring layers crossed at an angle less than 40°, made of non H₂S steel.

The invention also relates to a method for designing a flowline type flexible pipe used for carrying fluids under pressure containing H₂S once laid on the sea bottom, said pipe comprising a body, an internal sealing sheath, at least one steel armouring layer withstanding the stresses induced by the inside/outside pressure difference, at least one traction-resisting steel armouring layer spirally wound at an angle less than 45° in relation to the axis of the pipe. The method comprises the following stages:

determining a stress level in a non H₂S steel that can be used for said traction-resisting armouring layer, a level below which the steel retains, in a H₂S ambience, a sufficient mechanical strength for said pipe, dimensioning said traction-resisting steel armouring layer spirally wound at an angle less than 45° in relation to the axis of the pipe so that the stresses induced under working pressure conditions in the wires of said traction layer are below said level, manufacturing said traction-resisting steel armouring layer spirally wound at an angle less than 45° in relation to the axis of the pipe from said steel that does not meet the H₂S resistance criteria.

BRIEF DESCRIPTION OF THE DRAWINGS

Other features and advantages of the present invention will be clear from reading the description hereafter of non-limitative examples, with reference to the accompanying figures wherein.

DETAILED DESCRIPTION

Figure 1:
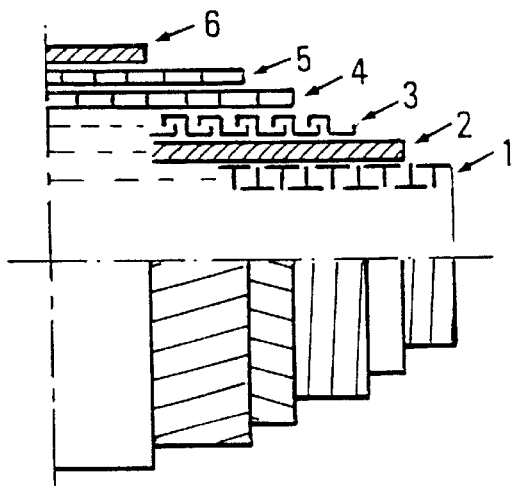
FIG. 1 is a cross-sectional view of the structure of a flexible pipe of the type including a pressure layer.

In FIG. 1, reference number 1 designates a body, i.e. a flexible tubular layer consisting of at least two wires having a T or U-shaped section comprising lateral ribs for fastening in the direction of the pipe axis. The two T-shaped wires are therefore arranged head to tail, for example according to the description given in document EP-0,431,142 B1 mentioned here by way of reference. The helical winding angle is close to 90° in relation to the longitudinal axis of the string. Of course, it is possible to combine a T-shaped wire with a U-shaped wire, or two U-shaped wires. The function of such a body, that is not sealed against the fluids carried, is to prevent collapse of the sealing sheath when a low pressure prevails in the pipe, i.e. when the inside pressure is lower than the outside pressure. Bodies made of U-shaped and/or T-shaped wires allow to obtain a high collapse strength which is a function of the inertia of the section of the wires, within the limits of manufacturing possibilities. However, bodies made of interlocked steel tape can be suitable in some cases, for example if the steel tape used is made of a high-strength metal or if the body is of caisson type, as described in document EP-0,494,299 B1.

Reference number 2 designates a polymer sheath whose function is to provide a seal between the pipe and the fluid carried therein.

Reference number 3 designates a pressure layer type structure made of Zeta type self-interlocking wires or of U-type and/or T-type interlocked wires as for the body described above. This structure also consists of small-pitch helical windings. The main function of the pressure layer is to withstand the stresses due to the inside pressure, burst stresses transmitted by the sealing sheath and/or the collapse stresses due to the inside/outside pressure difference transmitted by the traction-resisting wires.

Reference numbers 4 and 5 designate the armouring wires intended for tensile strength. Their section is generally rectangular, the angle of the spiral ranges between 20 and 40° in relation to the axis of the pipe. The two layers are wound in opposite directions.

An external polymer sheath 6 is externally extruded.

Figure 2:
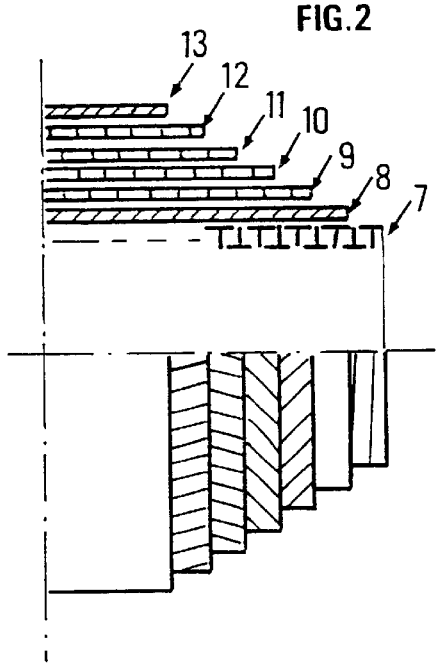
FIG. 2 shows, also in cross-sectional view, the structure of a flexible pipe of a type without a pressure layer.

FIG. 2 illustrates another type of flexible pipe structure without a pressure layer.

It comprises, as above, a body 7 and a sealing sheath 8. The pressure-resisting layer is here replaced by two layers 9 and 10 of wires helically arranged at an angle close to 55°. The two layers are wound at opposite angles. In case of a very high pressure, at least first layer 9 in contact with sheath 8 consists of interlocked wires. These two layers 9 and 10 withstand the inside/outside pressure difference that generates circumferential stresses and longitudinal stresses.

Reference numbers 11 and 12 designate two traction-resisting armouring layers that are complementary to the previous two layers. These two traction wire layers are mainly calculated according to the longitudinal stresses due to the laying of a flowline type flexible pipe. In fact, during operation, these armourings are no longer subjected to great stresses.

Figure 3:
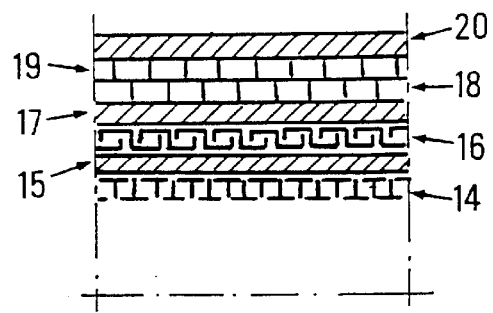
FIG. 3 shows a variant of a flexible pipe structure according to the invention comprising a specific intermediate sealing sheath.

FIG. 3 illustrates a variant of the flexible pipe structure according to FIG. 1. A body 14 is surrounded by a polymer sealing sheath 15. A pressure layer 16, for example made of Zeta wire, is wound round the sheath. This variant is different in that it comprises an intermediate other sealing sheath 17 between layer 16 and the two traction-resisting armouring layers 18 and 19. Intermediate sheath 17 can limit the propagation of gas H₂S from the inside of the annular space containing the pressure armours to the outside of said pipe where the other armours are arranged. An external sheath 20 is externally extruded. The present variant also applies to the structure illustrated by FIG. 2, an intermediate sheath is in this case interposed between the armouring layers at 55° (9 and 10) and traction layers 11 and 12. One of the advantages of this variant is that it allows to use very high strength steels (therefore not resistant to gas H₂S corrosion, i.e. a steel referred to as <<non H₂S steel>>), whose cost is very moderate for the group of traction-resisting armouring layers arranged outside sheath 17.

The function of intermediate sheath 17 in both variants is to physically separate the pressure-resisting armouring layers (3; 9, 10; 16), particularly subjected to the working pressure, from the armouring layers that are more suited to take up the laying stresses (4, 5; 11, 12; 18, 19), therefore less subjected to the working pressure, in order to limit the corrosive gas content in the annulus defined by intermediate sheath 17 and external sheath 20 or 13. It is clear that the presence of this intermediate sheath is not essential since it does not change the stress values in the armouring layers which are a determining parameter in the design of the flexible pipes according to the invention.

The following tables allow to show non-limitative examples of flexible pipes according to the present invention:

EXAMPLE 1

Structures with Pressure Layer of Inside Diameter 6 Inches (152.4 mm) and 8 Inches (203.2): (Table 1)

The flexible pipe according to the invention is provided with armouring layers 3 and 4 made from a FM72 steel having an elastic limit Rp0.2 of 1260 MPa, which does not meet the criteria of $H_2S$ wires. This structure allows to reach great setting depths while having working stresses in the reinforcing wires that are markedly below the 200 MPa threshold for traction armouring layers 3 and 4 made of non $H_2S$ steel. The 32C1 steel used for the pressure layer and armouring layers 1 and 2, in this example, has been hardened and tempered in order to obtain an elastic limit Rp0.2 of the order of 700 MPa which allows to withstand corrosion in a $H_2S$ ambience. Using non $H_2S$ steel allows to obtain either a weight gain for the pipe, or a greater setting depth, or a lower cost.

EXAMPLE 2

Structure Without a Pressure Layer (Table 2)

The operating stresses in armouring wires 3 and 4 made of non $H_2S$ steel are very low in relation to the 200 MPa threshold.

TABLE 1

| Layers | 6" flexible pipe | 8" flexible pipe |
| --- | --- | --- |
| Body | Stainless steel T-shaped wire<br>Rp0.2 = 650 MPa<br>Thickness 9 mm | Stainless steel T-shaped wire<br>Rp0.2 = 650 MPa<br>Thickness 10 mm |
| Sheath | Thickness 6.5 mm | Thickness 6 mm |
| Pressure layer | Zeta wire, 32C1 steel<br>Rp0.2 = 700 MPa<br>Thickness 8 mm | T-shaped wire, 30CD4 steel<br>Rp0.2 = 650 MPa<br>Thickness 12 mm |
| Armouring 1-angle + 35° | Flat wire, 32C1 steel<br>Rp0.2 = 700 MPa<br>Thickness 7 mm | Flat wire, 32C1 steel<br>Rp0.2 = 700 MPa<br>Thickness 7 mm |
| Armouring 2-angle − 35° | Flat wire, 32C1 steel<br>Rp0.2 = 700 MPa<br>Thickness 7 mm | Flat wire, 32C1 steel<br>Rp0.2 = 700 MPa<br>Thickness 7 mm |
| Intermediate sheath | Thickness 5 mm | Thickness 5 mm |
| Armouring 3-angle + 25° | Flat wire, FM72 steel<br>Rp0.2 = 1260 MPa<br>Thickness 7 mm | Flat wire, FM72 steel<br>Rp0.2 = 1260 MPa<br>Thickness 7 mm |
| Armouring 4-angle − 25° | Flat wire, FM72 steel<br>Rp0.2 = 1260 MPa<br>Thickness 7 mm | Flat wire, FM72 steel<br>Rp0.2 = 1260 MPa<br>Thickness 7 mm |
| External sheath (6) | Thickness 6 mm | Thickness 12 mm |
| Characteristics | | |
| Inside diameter | 6" (152.4 mm) | 8" (203 mm) |
| Outside diameter | 284.5 mm | 356.1 mm |
| Empty weight in air | 220.42 kg/m | 307.68 kg/m |
| Empty weight in water | 155.26 kg/m | 205.6 kg/m |
| Collapse pressure | 323 bars | 315 bars |
| Setting depth | 2791 m | 2560 m |
| Max. inside pressure | 572 bars | 526 bars |
| Stresses in armouring due to the working pressure | Zeta pressure layer 398 MPa<br>Armouring 1:97 MPa<br>Armouring 2:101 MPa<br>Armouring 3:23 MPa<br>Armouring 4:37 MPa | Zeta pressure layer:357 MPa<br>Armouring 1:105 MPa<br>Armouring 2:107 MPa<br>Armouring 3:46 MPa<br>Armouring 4:51 MPa |

TABLE 2

| Layers | 6" flexible pipe | 8" flexible pipe |
| --- | --- | --- |
| Body | Stainless steel T-shaped wire<br>Rp0.2 = 650 MPa<br>Thickness 10 mm | Stainless steel T-shaped wire<br>Rp0.2 = 650 MPa<br>Thickness 14 mm |
| Sheath | Thickness 6.5 mm | Thickness 6.5 mm |
| Armouring 1-angle + 55° | 32C1 steel wire<br>Rp0.2 = 700 MPa<br>Thickness 7 mm | 32C1 steel wire<br>Rp0.2 = 700 MPa<br>Thickness 7 mm |

TABLE 2-continued

| Layers | 6" flexible pipe | 8" flexible pipe |
|---|---|---|
| Armouring 2-angle – 55° | 32C1 steel wire<br>Rp0.2 = 700 MPa<br>Thickness 7 mm | 32C1 steel wire<br>Rp0.2 = 700 MPa<br>Thickness 7 mm |
| Intermediate sheath | Thickness 5 mm | Thickness 5 mm |
| Armouring 3-angle + 25° | Flat wire, FM72 steel<br>Rp0.2 = 1260 MPa<br>Thickness 5.5 mm | Flat wire, FM72 steel<br>Rp0.2 = 1260 MPa<br>Thickness 7 mm |
| Armouring 4-angle – 25° | Flat wire, FM72 steel<br>Rp0.2 = 1260 MPa<br>Thickness 5.5 mm | Flat wire, FM72 steel<br>Rp0.2 = 1260 MPa<br>Thickness 7 mm |
| External sheath (13) | Thickness 6 mm | Thickness 6 mm |
| Characteristics | | |
| Inside diameter | 6" (152.4 mm) | 8" (203.2 mm) |
| Outside diameter | 261.9 mm | 328.30 mm |
| Empty weight in air | 166.48 kg/m | 254.44 kg/m |
| Empty weight in water | 111.26 kg/m | 167.67 kg/m |
| Collapse pressure | 305 bars | 334 bars |
| Setting depth | 2691 m | 2780 m |
| Max. inside pressure | 610 bars | 477 bars |
| Stresses in armouring due to the working pressure | Armouring 1:385 MPa<br>Armouring 2:345 MPa<br>Armouring 3:0 MPa<br>Armouring 4:15 MPa | Armouring 1:384 MPa<br>Armouring 2:356 MPa<br>Armouring 3:0 MPa<br>Armouring 4:9 MPa |

The structures given here by way of example have been calculated according to well-known rules and to the usual safety coefficients recommended by standard API Specification 17J. The following documents can be referred to:

«Calculation of stresses and slip in structural layers of unbonded flexible pipes», Feret J. J., Bournazel C. L., Journal of Offshore Mechanics and Artic Engineering, Vol. 109, pp.263–269, 1987;

«On the axial-torsional structural behaviour of flexible pipes, umbilicals and marine cables», Witz J. A., Tan Z., Journal of Marine Structures, 1992;

«Handbook on design and operation of flexible pipes», Berge et al., Sintef Report No.STF70-A920006, 1992.

In order to confirm the advantages of the structures according to the present invention, it must be checked that the possible degradation by a $H_2S$ environment of non $H_2S$ steel armourings, whose operating stresses are below a determined threshold, is compatible with the pipe handling (laying and pulling), working strength and safety requirements.

Two types of hydrogen embrittlement risks in a $H_2S$ environment have thus been studied a) sensitivity to stress-corrosion cracking SSCC, under a low stress level, b) sensitivity to hydrogen-induced cracking (HIC) and residual mechanical behaviour in case of blistering.

The study was concerned with the two steel grades with high mechanical characteristics used for armours 3 and 4 in Tables 1 and 2:

FM72 carbon steel as rolled,

32C1 low-alloy steel as hardened and only stress-relieved to obtain the mechanical characteristics below.

The chemical composition of these grades is given in the table hereafter:

Chemical Composition of the Steels Studied ($10^{-3}$%)

| Grade | Cast | C | Mn | Si | P | S | Cr | Ni | Al | Cu | Mo |
|---|---|---|---|---|---|---|---|---|---|---|---|
| FM72 | G46796 | 630 | 639 | 184 | 7 | 9 | 55 | 41 | 29 | 32 | 8 |
| 32C1 | G42329 | 326 | 752 | 184 | 6 | 13 | 338 | 34 | 44 | 35 | 13 |

Their mechanical properties have been studied as regards traction and the results obtained are as follows:

| Grade | Rp0.2 (MPa) | Rm (MPa) |
|---|---|---|
| FM72 | 1241 | 1462 |
| 32C1 | 1002 | 1118 |

These mechanical strength characteristics are higher by 30 to 70% than those of the low-alloy carbon steels that can be used for applications in $H_2S$ environments according to the criteria defined above.

Tests for determining their sensitivity to hydrogen embrittlement have been carried out in a $H_2S$ ambience according to the NACE testing standard recommendations (TM0177 and TM0284). Samples have therefore been taken from the wires provided, by symmetrical machining on all the faces. Their final section was 13×3.3 (mm) for FM72 and 11×4 (mm) for 32C1.

The SSCC resistance has been measured on 150-mm long samples according to the TM0177-96 procedure, under a load of 200 MPa which is much higher than the calculated working stresses (Tables 1 and 2).

The method described in the TM0284 standard has been used to study the HIC sensitivity by using synthetic sea water as the medium:

at pH=5, as described in the TM0284-87 procedure, at pH=3 after acidification, according to the new version of the TM0284-96 standard.

After testing, the samples subjected to the HIC and SSCC tests have been:

a) examined by ultrasonic control in order to detect and to quantify the damage. produced (blisters), b) subjected to a traction test in order to measure the residual mechanical properties despite this possible damage (except in case of break during the SSCC test).

A) SSCC Stress Cracking Behaviour

The table below gives the results of the SSCC tests under 200 MPa as well as those of the ultrasonic control and of the traction tests performed thereafter.

TABLE 3

Results of the SSCC tests according to NACE TM0177-96

| Grade | PR of the solution (beginning/end) | SSCC break (time) | Ultrasonic control (blisters*) | Surface area affected (%) | Mechanical properties after testing (MPa) | |
|---|---|---|---|---|---|---|
| | | | | | Rp0.2 | Rm |
| FM72 | 2.75/3.7 | No | Many | >50 | 1189 (−4.2%) | 1325 (−9.4%) |
| 32C1 | 2.7/3.5 | Yes(≦6 d) | 2 to 3 | 20 | — | |
| 32C1 | 5.25/4.8 | No | Nothing to report | 0 | 1001 (−0.1%) | 1083 (−3.1%) |

*quantity per sample

Considering the dimensioning criteria relative to flexible pipe structures (maximum stresses exerted on the setting armours, much below the elastic limit), an armouring wire made of FM72 steel as rolled, even damaged, can allow lifting of a pipe according to the invention.

B) Hydrogen-induced Cracking (HIC) Behaviour

The results obtained concerning HIC damage and the residual traction characteristics are given in Table 4 hereunder:

TABLE 4

Results of HIC tests according to NACF TM0284

| Grade | NACE procedure | pH value of the medium | Ultrasonic control (blisters*) | Surface area affected (%) | Mechanical properties after testing | |
|---|---|---|---|---|---|---|
| | | | | | Rp0.2 | Rm |
| FM72 | TM0284/87 | 4.8 | Many | >50 | 1170 (−5.7%) | 1408 (−3.7%) |
| FM72 | TM0284/96 | 2.8 | Many | >50 | 1168 (−5.9%) | 1357 (−7.2%) |
| 32C1 | TM0284/87 | 4.8 | 1 | 0.95 | 990 (−1.2%) | 1105 (−1.2%) |
| 32C1 | TM0284/96 | 2.8 | 6 to 9 | 16.3 | 1001 (−0.1%) | 1098 (−1.8%) |

*quantity per sample

The 32C1 steel is greatly embrittled in a $H_2S$ medium with a low pH value ($\leq 3$) despite the low load rate applied (20% of Rp0.2), and it breaks then very quickly. In the treated state studied, it is therefore unsuited to an application in a very acid medium.

On the other hand, for a less severe medium (pH ~5), the 32C1 steel passed the test successfully but it also appeared that no measurable alteration could be observed. The ultrasonic control thus showed an excellent blistering resistance and the mechanical properties are not altered.

The FM72 steel as rolled shows a high blistering sensitivity in a $H_2S$ medium. However, no break has been observed during the tests at pH=3 and its residual elastic limit is more than 95% of the initial value.

The results obtained show that the two high-strength steels studied are sensitive to hydrogen damage. This sensitivity is particularly high in the case of FM72 which shows a very high blistering rate, even with the less acid pH value. As for 32C1, this blistering rate is markedly lower and varies with the acidity of the medium.

The poor HIC behaviour of these steels is not surprising and this result could easily be expected because of their treatment condition and of the associated resulting mechanical strength level. Despite the presence of blisters, the elastic limit and the tensile strength of the FM72 grade are not much affected and those of 32C1 can be considered to be unaltered.

In both cases, such a decline in the properties can be taken into account during the initial design stage.

The HIC tests carried out show that the high-strength steels tested (in particular FM72) are sensitive to blistering type damage, even for moderately acid pH values. This steel is therefore not a <<H$_2$S>> steel according to the criteria described.

However, the mechanical traction properties, in particular the elastic limit, are not much affected by the induced defects. This means that the armouring wires in question can still properly fulfill their function during operations such as flexible pipe lifting or laying.

SSCC tests under low load (below 200 MPa) show the risks of stress cracking failure during operation. The results show that the 32C1 steel as hardened and stress-relieved cannot be selected in the case of very low pH values (NACE TM0177 medium), but that it could be used for less acid media (pH limit to be determined). At pH=5 for example, it undergoes no damage and its traction properties remain unaltered.

As for FM72 steel as rolled, it can be used up to pH=3, despite a greatly blistered microstructure. The low load rate applied causes no failure and the apparent elastic limit is decreased by only about 5% after testing. Such armours should thus easily allow handling operations on site, even after several years of use.

Using non H$_2$S steels, notably those exhibiting high mechanical characteristics (Rp0.2>700 MPa) and sensitive to hydrogen-induced cracking (HIC), for armouring layers intended to withstand stresses during laying of flowline type pipes intended for a H$_2$S environment is possible insofar as, during operation, the load stresses remain low and below a threshold that can be determined, experimentally for example, for each steel.

What is claimed is:

1. A flexible tubular pipe intended to carry fluids under pressure containing H$_2$S, said pipe comprising a body, an internal sealing sheath, at least one steel armouring layer withstanding stresses induced by the inside/outside pressure difference, at least one tension-resisting steel armouring layer spirally wound at an angle less than 45° in relation to the axis of the pipe, characterized in that at least said armouring layer withstanding stresses induced by the inside/outside pressure difference is made of a determined steel meeting H$_2$S resistance criteria, and in that at least said tension-resisting armouring layer is made from steel wires that do not meet H$_2$S resistance criteria.

2. A pipe as claimed in claim 1, characterized in that it comprises an intermediate sheath on the outside of which, in relation to the inside of the pipe, said tension-resisting armouring layer made from steel wires that do not meet H$_2$S resistance criteria is arranged.

3. A pipe as claimed in claim 1, characterized in that said steel armouring layer withstanding stresses induced by the inside/outside pressure difference comprises at least reinforcing wires wound at an angle close to 90° in relation to the axis of the pipe.

4. A pipe as claimed in calm 3, characterized in that it comprises in combination, from the inside to the outside, the body, the internal sealing sheath, a pressure layer made of wires spirally wound at an angle close to 90°, two armouring layers crossed at an angle less than 40° withstanding stresses induced by the inside/outside pressure difference made of steel referred to as <<H$_2$S>> steel, and two tension-resisting armouring layers crossed at an angle less than 40° made of non H$_2$S steel.

5. A pipe as claimed in claim 1, characterized in that said steel armouring layer withstanding stresses induced by the inside/outside pressure difference comprises at least reinforcing wires wound at an angle close to 55°.

6. A pipe as claimed in claim 5, characterized in that is comprises in combination, from the inside to the outside, the body, the internal sealing sheath, two armouring layers cross at 55° withstanding stresses induced by the inside/outside pressure difference made of steel referred to as <<H$_2$S>> steel, and two tension-resisting armouring layers crossed at an angle less than 40° made of non H$_2$S steel.

7. A method used for designing a flowline type flexible pipe intended to carry fluids under pressure containing H$_2$S once laid on the sea bottom, said pipe comprising a body, an internal sealing sheath, at least one steel armouring layer withstanding stresses induced by the inside/outside pressure difference made of a determined steel meeting H$_2$S resistance criteria, at least one traction-resisting steel armouring layer spirally wound at an angle less than 45° in relation to the axis of the pipe, characterized in that it comprises the following stages:

determining a stress level in a non H$_2$S steel that can be used for said traction-resisting armouring layer, a level below which the steel retains a sufficient mechanical strength to allow said pipe to be lifted in a H$_2$S ambience, dimensioning said traction-resisting steel armouring layer spirally wound at an angle less than 45° in relation to the axis of the pipe so that the stresses under operating pressure conditions in the wires of said traction layer are below said level, manufacturing said traction-resisting steel armouring layer spirally wound at an angles less than 40° in relation to the axis of the pipe from said steel that does not meet H$_2$S resistance criteria.

* * * * *